UNITED STATES PATENT OFFICE.

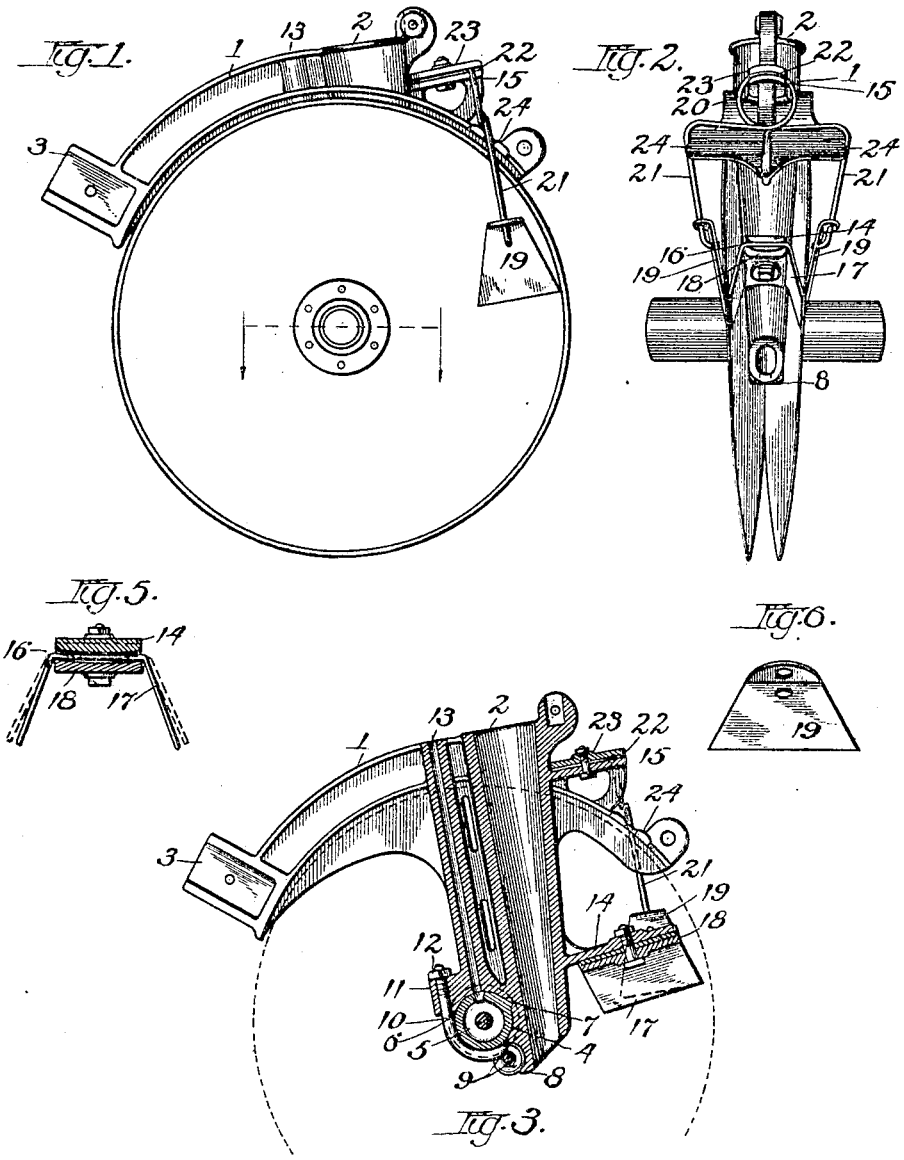

HENRY J. CASE, OF OWASCO, NEW YORK, ASSIGNOR TO INTERNATIONAL HARVESTER COMPANY, OF CHICAGO, ILLINOIS, A CORPORATION OF NEW JERSEY.

DOUBLE-DISK DRILL.

No. 799,143.      Specification of Letters Patent.      Patented Sept. 12, 1905.

Application filed September 6, 1904. Serial No. 223,313.

*To all whom it may concern:*

Be it known that I, HENRY J. CASE, a citizen of the United States, residing at the town of Owasco, in the county of Cayuga and State of New York, have invented certain new and useful Improvements in Double-Disk Drills, of which the following is a specification, reference being had to the accompanying drawings, forming a part thereof.

My invention relates to improvements in double-disk drills, the object of the invention being to provide improved bearings for the disks and improved scrapers for cleaning the inner and outer surfaces of the disks, and, further, to provide bearings for the disks that are separable from the main support and are readily attached or detached therefrom, so that when worn or broken the bearings may be replaced by new parts.

With these objects in view the invention consists in certain novel features of construction and combination and arrangement of parts, as will be more fully hereinafter described.

In the drawings, Figure 1 is a view in side elevation, illustrating my improvements. Fig. 2 is a rear view of Fig. 1. Fig. 3 is a sectional view of a part of Fig. 2 on line 3'. Fig. 4 is a sectional view of a part of Fig. 3 on line 4', and Figs. 5 and 6 are details of the scraper devices.

Like reference-numerals represent like parts throughout the various views.

1 represents the disk-support having the seed-tube 2 and the arm 3, to which the usual drag-bar may be attached. At the bottom of the support there is a semicircular seat or bearing 4, adapted to receive a double-disk axle 5, having an enlarged central portion and oppositely-disposed journals at an angle with each other, upon which the disks are mounted. The axle 5 has a peripheral groove 6 around its central portion and a bridge-piece 7 across the groove that fits into a seat in the semicircular bearing 4, as shown in Fig. 3. Below the bearing there is formed on the support 1 a projecting earpiece 8, adapted to receive the eye 9 of a curved eyebolt 10, that has its upper end threaded and passed through an earpiece 11 above the semicircular bearing 4 and receives a nut 12, which being tightened serves to draw the curved bolt into the groove in the axle-piece and clamp it against the bearing, the bridge-piece 7 preventing any accidental turning of the axle.

The support 1 is provided with an oil-conduit 13, leading to an opening at the upper side of the axle, through which the oil descends to the interior of the axle and flows through the orifices in the journals to the disk-bearings.

For the purpose of attaching the scraper devices for cleaning both the inner and outer surfaces of the disks the support 1 is provided with projecting lugs 14 and 15. Lug 14 is provided with a convex seat 16, and 17 is a double-ended U-shaped sheet-steel scraper shaped at its diverging ends to conform with the opposing disk-surfaces. The double scraper is held against the convex surface of the lug by means of a bolt and an intervening washer 18, having a concave side opposed to the convex surface of the lug, the operation of the parts being such as to cause the diverging wings of the scraper to press against the disks as the bolt is tightened with a yielding force. The scrapers 19 for the outside of the disks are approximately triangular in shape, having one corner bent at right angles to the body portion and provided with two holes for the insertion of the holding means—one in the body portion and the other in the turned-up portion, as shown in Fig. 6.

The holding means consist of a single piece of wire having its opposite ends bent in L shape and adapted to receive the scrapers, as shown in Fig. 2. The wire is formed with an open coil 20 at its central portion and then bent in the shape of an inverted U, having its legs 21 converging toward each other. The open coil is seated in a convex groove 22, formed in the convex surface of the lug portion 15 of the support 1, and a clamp-plate 23, having a meeting concave surface and gooove, is secured above the wire in a manner to hold the wire from displacement. Upon opposite sides of the lug portion 15 are projecting arms 24, having notches at their ends to receive the upper ends of the legs of the scraper-holding device for the purpose of assisting to maintain it in proper position relative to the disks.

By the means provided the scrapers are yieldingly held in contact with the disks in a lateral direction and are free to turn on the wires to a limited extent in following any unevenness of the disk-surface.

What I claim, and desire to secure by Letters Patent, is—

1. In a grain-drill, the combination of furrow-opening disks, a scraper device having one side bent at approximately right angles with the body portion, an opening in the bent side and also in the body portion and a holding means comprising a spring-wire suitably supported adjacent to the disk and having its end formed to sustain the scraper by engaging with the openings therein.

2. In a grain-drill, the combination of a disk-support, furrow-opening disks mounted upon opposite sides thereof, a scraper-holding device comprising a single wire having an open coil at its center, oppositely-disposed arm portions and depending leg portions, scrapers mounted on the leg portions, the whole being held in operative position relative to the disks.

3. In a grain-drill, the combination of a disk-support, furrow-opening disks mounted upon opposite sides thereof, a scraper-holding device comprising a single wire having an open coil at its center, oppositely-disposed arm portions and depending leg portions, scrapers mounted on the leg portions, the whole being held in operative position relative to the disks by having the open coil secured to the disk-support.

4. In a grain-drill, the combination of a disk-support, furrow-opening disks mounted upon opposite sides thereof, a scraper-holding device comprising a single wire having an open coil at its center, oppositely-disposed arm portions and depending leg portions, scrapers mounted on the leg portions, the said disk-support being provided with a rearwardly-projecting lug portion adapted to receive the upper side of the said open coil, and laterally-projecting wing portions notched to receive the leg portions of said holding device, and means for securing said open coil to said lug portion.

In witness whereof I hereto affix my signature in presence of two witnesses.

HENRY J. CASE.

Witnesses:
  LUD. HOLLAND-LETZ,
  H. C. BUFFINGTON.